US012631210B2

(12) United States Patent
Shinoda et al.

(10) Patent No.: US 12,631,210 B2
(45) Date of Patent: May 19, 2026

(54) FOIL BEARING

(71) Applicant: KABUSHIKI KAISHA TOYOTA JIDOSHOKKI, Kariya (JP)

(72) Inventors: Fumiya Shinoda, Kariya (JP); Fumihiro Suzuki, Kariya (JP); Kenta Nakane, Kariya (JP); Yuuji Iwakiri, Nagakute (JP); Tomohisa Yamada, Nagakute (JP); Yasuhiro Kondoh, Nagakute (JP); Haruhiro Hattori, Nagakute (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 135 days.

(21) Appl. No.: 18/615,253

(22) Filed: Mar. 25, 2024

(65) Prior Publication Data

US 2024/0328455 A1     Oct. 3, 2024

(30) Foreign Application Priority Data

Mar. 31, 2023     (JP) ................................. 2023-057142

(51) Int. Cl.
*F16C 17/02*     (2006.01)

(52) U.S. Cl.
CPC .................................. *F16C 17/024* (2013.01)

(58) Field of Classification Search
CPC .................................................... F16C 17/024
See application file for complete search history.

(56) References Cited

U.S. PATENT DOCUMENTS

| | | | |
|---|---|---|---|
| 4,415,281 A * | 11/1983 | Agrawal | F16C 17/024 384/106 |
| 5,584,582 A * | 12/1996 | Brown | F16C 17/024 384/106 |
| 9,360,042 B2 * | 6/2016 | Thompson | F16C 43/02 |
| 2007/0047858 A1 * | 3/2007 | Hurley | F16C 17/024 384/106 |
| 2024/0026921 A1 * | 1/2024 | Shinoda | F16C 17/024 |

FOREIGN PATENT DOCUMENTS

JP            58-48769 B2    10/1983

* cited by examiner

*Primary Examiner* — James Pilkington
(74) *Attorney, Agent, or Firm* — Sughrue Mion, PLLC

(57)     ABSTRACT

The foil bearing includes a housing, a top foil, and bump foils. The bump foil includes first support portions that contact an outer circumferential surface of the top foil, second support portions that contact an inner circumferential surface of the housing, and coupling portions that couple the first support portions and the second support portions together such that the first support portions and the second support portions are disposed alternately in a rotation direction of a rotating body. When a load input from the rotating body increases, the bump foil is deformed to increase one of the number of the first support portions that contact the outer circumferential surface of the top foil and the number of the second support portions that contact the inner circumferential surface of the housing before increasing the other one of the numbers.

5 Claims, 6 Drawing Sheets

FOIL BEARING

BACKGROUND

1. Field

The present disclosure relates to a foil bearing.

2. Description of Related Art

A foil bearing supports a rotary shaft in a radial direction. The foil bearing includes a housing, a top foil, and bump foils. The housing includes an insertion hole, into which a rotating body is inserted. The top foil faces the rotating body, has the shape of a sheet, and includes a bearing surface. The bump foils each have the shape of a sheet. The bump foils are disposed between the housing and the top foil.

Each bump foil includes first support portions, which contact the outer circumferential surface of the top foil, and second support portions, which contact the inner circumferential surface of the housing. In this foil bearing, an increase in the load from the rotating body simultaneously increases the number of the first support portions that contact the outer circumferential surface of the top foil and the number of second support portions that contact the inner circumferential surface of the housing, so that the foil bearing elastically supports the top foil (for example, refer to Japanese Examined Patent Publication No. 58-048769).

In a foil bearing that includes bump foils with a dual rate spring structure, it is desirable to prevent the reliability of each of the first support portions and second support portions from being decreased.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a foil bearing includes a housing that includes an insertion hole into which a rotating body is inserted, a sheet-shaped top foil that includes a bearing surface facing the rotating body, and a sheet-shaped bump foil. The bump foil includes first support portions configured to contact an outer circumferential surface of the top foil, second support portions configured to contact an inner circumferential surface of the housing, and coupling portions that couple the first support portions and the second support portions together such that the first support portions and the second support portions are disposed alternately in a rotation direction of the rotating body. The bump foil is configured to elastically support the top foil by extending the first support portions and the second support portions in the rotation direction. The bump foil is configured such that, when a load input from the rotating body increases, the bump foil is deformed to increase a number of the first support portions that contact the outer circumferential surface of the top foil and a number of the second support portions that contact the inner circumferential surface of the housing. The bump foil is configured such that, when the load input from the rotating body increases, the bump foil is deformed to increase one of the number of the first support portions that contact the outer circumferential surface of the top foil and the number of the second support portions that contact the inner circumferential surface of the housing before increasing the other one of the number of first support portions and the number of the second support portions.

Other features and aspects will be apparent from the following detailed description, the drawings, and the claims.

BRIEF DESCRIPTION OF THE DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

This description provides a comprehensive understanding of the methods, apparatuses, and/or systems described. Modifications and equivalents of the methods, apparatuses, and/or systems described are apparent to one of ordinary skill in the art. Sequences of operations are exemplary, and may be changed as apparent to one of ordinary skill in the art, except for operations necessarily occurring in a certain order. Descriptions of functions and constructions that are well known to one of ordinary skill in the art may be omitted.

Exemplary embodiments may have different forms, and are not limited to the examples described. However, the examples described are thorough and complete, and convey the full scope of the disclosure to one of ordinary skill in the art.

In this specification, "at least one of A and B" should be understood to mean "only A, only B, or both A and B."

First Embodiment

A foil bearing 10 according to a first embodiment will now be described with reference to FIGS. 1 to 6. The foil bearing 10 according to the present embodiment is mounted on a centrifugal compressor 100.

Centrifugal Compressor

Figure 1:
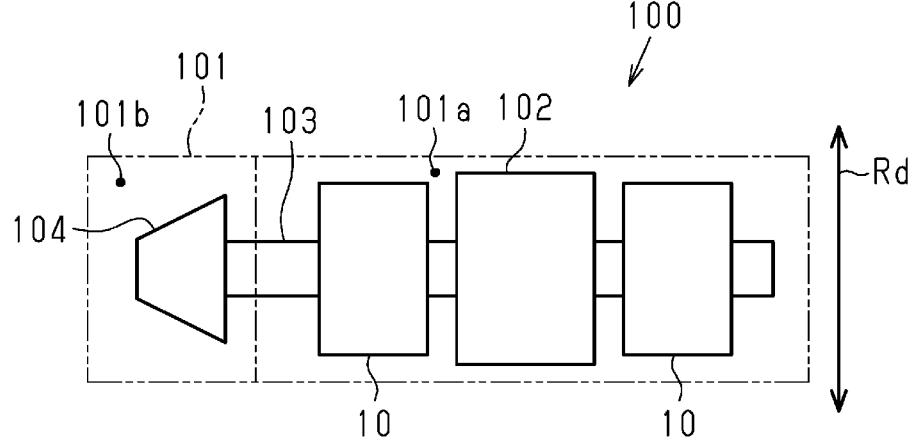
FIG. 1 is a schematic diagram showing a centrifugal compressor equipped with a foil bearing.

As shown in FIG. 1, the centrifugal compressor 100 includes two foil bearings 10, a housing 101, an electric motor 102, a rotating body 103, and an impeller 104. The housing 101 includes a motor chamber 101a and an impeller chamber 101b. The electric motor 102 is accommodated in the motor chamber 101a. The rotating body 103 is a rotary shaft that rotates when the electric motor 102 is driven. The rotating body 103 extends in the motor chamber 101a and the impeller chamber 101b. The impeller 104 is attached to the rotating body 103.

The impeller 104 is accommodated in the impeller chamber 101b. The electric motor 102, the rotating body 103, and the impeller 104 are accommodated in the housing 101. When the electric motor 102 operates and rotates the rotating body 103, the impeller 104 rotates. When the impeller 104 rotates, a fluid is drawn into the impeller chamber 101b from the outside of the housing 101. The fluid drawn into the impeller chamber 101b is compressed as the impeller 104 rotates. The compressed fluid is discharged to the outside of the housing 101.

The two foil bearings 10 support the rotating body 103 in a radial direction Rd. The two foil bearings 10 are located at the opposite sides of the electric motor 102 in the axial direction of the rotating body 103. The two foil bearings 10 are fixed to the housing 101.

Foil Bearing

Figure 3:
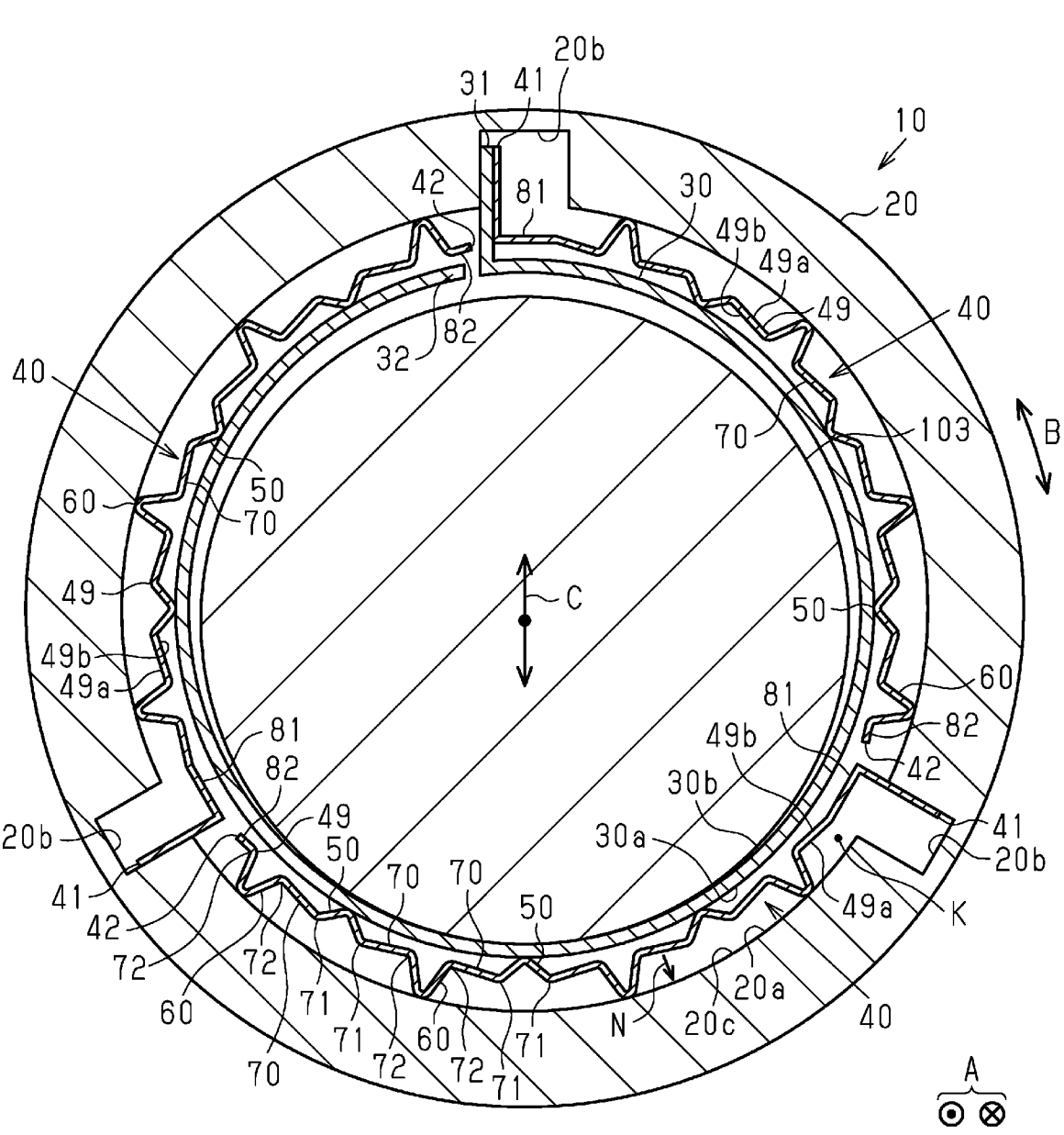
FIG. 3 is a cross-sectional view of the foil bearing shown in FIG. 1.

As shown in FIG. 3, the foil bearing 10 includes a tubular housing 20, a sheet-shaped top foil 30, and three sheet-shaped bump foils 40. FIG. 3 shows the foil bearing 10 in a state in which the rotating body 103 is not rotating.

Bearing Housing

The housing 20 includes an insertion hole 20c, into which the rotating body 103 is inserted. The rotating body 103 is inserted into the insertion hole 20c of the housing 20. In the following description, the axial direction of the housing 20 will simply be referred to as an axial direction A, and a circumferential direction of the housing 20 will simply be referred to as a rotation direction B of the rotating body 103. The radial direction of the housing 20 will simply be referred to as a radial direction C.

The housing 20 includes an inner circumferential surface 20a. Holding grooves 20b are formed in the inner circumferential surface 20a of the housing 20. The number of the holding grooves 20b in the inner circumferential surface 20a is three. The three holding grooves 20b are disposed at equal intervals in the rotation direction B. The holding grooves 20b extend in the axial direction A. The material forming the housing 20 is, for example, aluminum.

Top Foil

The top foil 30 is disposed inside the housing 20. The top foil 30 includes a bearing surface 30b, which faces the rotating body 103, and an outer circumferential surface 30a, which is on the side opposite to the bearing surface 30b in the thickness direction of the top foil 30. A gap K is defined between the inner circumferential surface 20a of the housing 20 and the outer circumferential surface 30a of the top foil 30. The top foil 30 has the shape of a sheet and is disposed between the rotating body 103 and the housing 20. The top foil 30 is formed by curving a flexible elongated metal plate. The top foil 30 is substantially cylindrical. The axial direction of the top foil 30 agrees with the axial direction A. Thus, the axial direction of the top foil 30 is also referred to as the axial direction A. The circumferential direction of the top foil 30 agrees with the rotation direction B. Thus, the circumferential direction of the top foil 30 is also referred to as the rotation direction B. The radial direction of the top foil 30 agrees with the radial direction C. Thus, the radial direction of the top foil 30 is also referred to as the radial direction C. The top foil 30 is formed by curving an elongated metal plate into a tubular shape such that the long edges extend in the rotation direction B and the short edges extend in the axial direction A. The metal plate forming the top foil 30 is made of, for example, stainless steel or an Inconel® type nickel alloy. That is, the top foil 30 is made of a material having a higher hardness than the material of the housing 20.

The top foil 30 includes a fixed end 31 and a free end 32. The fixed end 31 is located at one of the opposite ends in the long-side direction of the metal plate forming the top foil 30, and the free end 32 is located at the other end. The fixed end 31 is located at one of the opposite ends of the top foil 30 in the rotation direction B, and the free end 32 is located at the other end of the top foil 30 in the rotation direction B. The fixed end 31 is formed by bending the metal plate forming the top foil 30. The fixed end 31 is inserted into one of the three holding grooves 20b. The fixed end 31 is fixed to the holding groove 20b by an axial-direction retaining member such as a snap ring. The free end 32 faces and is spaced apart from the proximal end of the fixed end 31 in the rotation direction B. Thus, the top foil 30 is an annular body from which a part is cut out.

Bump Foil

The three bump foils 40 are disposed in the gap K between the housing 20 and the top foil 30. Each of the three bump foils 40 is disposed outward, in the radial direction C, of the top foil 30 and inward, in the radial direction C, of the housing 20. The three bump foils 40 each elastically support the top foil 30 from between the housing 20 and the top foil 30. The three bump foils 40 are disposed at prescribed intervals in the rotation direction B. The thickness of each of the three bump foils 40 is less than the thickness of the top foil 30. That is, each of the three bump foils 40 has the shape of a sheet.

Each of the three bump foils 40 is formed by elastically deforming a flexible elongated metal plate 49 into an arcuate shape, while forming first support portions 50, second support portions 60, and coupling portions 70 in the metal plate 49. Each of the three bump foils 40 includes first support portions 50, which contact the outer circumferential surface 30a of the top foil 30, second support portions 60, which contact the inner circumferential surface 20a of the housing 20, and coupling portions 70, which couple the first support portions 50 and the second support portions 60 together such that the first support portions 50 and the second support portions 60 are disposed alternately in the rotation direction B of the rotating body 103.

Each of the three bump foils 40 is curved to extend in the rotation direction B of the rotating body 103. Each metal plate 49 includes a first surface 49a on one of the opposite sides in the thickness direction and a second surface 49b on the other side. Of the opposite surfaces of the metal plate 49 in the thickness direction, the first surface 49a is a surface facing the housing 20. Of the opposite surfaces of the metal plate 49 in the thickness direction, the second surface 49b is a surface facing the top foil 30.

The circumferential direction of the bump foil 40 agrees with the rotation direction B. Thus, the circumferential direction of the bump foil 40 will also be referred to as the rotation direction B. The radial direction of the bump foil 40 agrees with the radial direction C. Thus, the radial direction of the bump foil 40 will also be referred to as the radial direction C. The short-side direction of the metal plate 49 agrees with the axial direction A. The long-side direction of the metal plate 49 agrees with the rotation direction B. The metal plate 49 is made of, for example, stainless steel or an Inconel® type nickel alloy. The metal plate 49 is made of a material having a higher hardness than the material of the housing 20.

Each of the three bump foils 40 includes a fixed end 41 and a free end 42. The fixed end 41 is located at one of the opposite ends in the long-side direction of the metal plate 49, and the free end 42 is located at the other end. The fixed end 41 of each bump foil 40 is inserted into the corresponding holding groove 20b. One of the fixed ends 41 is inserted into one of the holding grooves 20b together with the fixed end 31 of the top foil 30. The fixed end 41 inserted into the holding groove 20b together with the fixed end 31 of the top foil 30 is fixed to the holding groove 20b together with the fixed end 31 of the top foil 30 by, for example, an axial-direction retaining member such as a snap ring. The remaining two fixed ends 41 are fixed to the remaining two holding grooves 20b by axial-direction retaining members such as snap rings. As for the bump foils 40 adjacent to each other in the rotation direction B, the free end 42 of one of the bump foils 40 is spaced apart from the fixed end 41 of the other bump foil 40 by a prescribed distance. The means of fixing the fixed ends 31, 41 to the holding grooves 20b may be changed.

Since the three bump foils 40 all have the same shape, one of the bump foils 40 will be described in detail below, and detailed description of the remaining two bump foils 40 will be omitted.

The bump foil 40 in a state in which the rotating body 103 is not rotating will now be described.

The bump foil 40 includes first support portions 50, second support portions 60, coupling portions 70, first bent sections 71, second bent sections 72, a first end plate portion 81, and a second end plate portion 82.

Each of the first support portions 50 is in contact with the outer circumferential surface 30a of the top foil 30. Each of the second support portions 60 is in contact with the inner circumferential surface 20a of the housing 20. Each of the coupling portions 70 couples the corresponding first support portion 50 and the corresponding second support portion 60 together such that the first support portions 50 and the second support portions 60 are disposed alternately in the rotation direction B of the rotating body 103. The bump foil 40 elastically supports the top foil 30 by extending the first support portions 50 and the second support portions 60 in the rotation direction B of the rotating body 103.

The coupling portions 70 are each rectangular as viewed in the radial direction C. When each coupling portion 70 is viewed in the radial direction C, the long sides of the elongated rectangular shape extend in the axial direction A, and the short sides of the elongated rectangular shape extend in the rotation direction B. Each coupling portion 70 extends substantially in the rotation direction B as viewed in the axial direction A.

Figure 4:
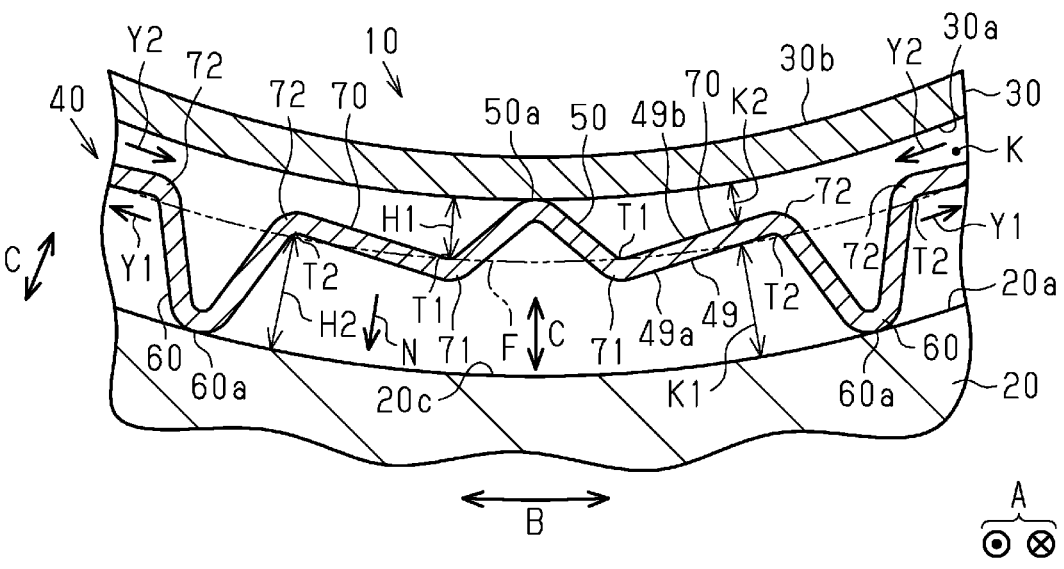
FIG. 4 is a partial cross-sectional view of the bump foil shown in FIG. 2 before an input load reaches a first prescribed value.

As shown in FIG. 4, each coupling portion 70 is located closer to the outer circumferential surface 30a of the top foil 30 than the middle position of the gap K in the radial direction C. In the radial direction C, the distance between the coupling portion 70 and the inner circumferential surface 20a of the housing 20 is longer than the distance between the coupling portion 70 and the outer circumferential surface 30a of the top foil 30. The distance between the first surface 49a of the coupling portion 70 and the inner circumferential surface 20a of the housing 20 is referred to as a distance K1.

The distance between the second surface 49b of the coupling portion 70 and the outer circumferential surface 30a of the top foil 30 is a referred to as a distance K2. When no load from the rotating body 103 is input to the top foil 30, the distance K1 is longer than the distance K2 at any position in the rotation direction B of the coupling portion 70.

Each of the first support portions 50 protrudes from the second surface 49b of the coupling portion 70 toward the outer circumferential surface 30a of the top foil 30. Each of the first support portions 50 is located between two of the coupling portions 70. Each of the first support portions 50 is formed by bending a metal plate 49, which forms the bump foil 40. Each of the first support portions 50 includes a first arcuate section 50a at a distal end in the protruding direction from the coupling portions 70. When each first support portion 50 is viewed in the axial direction A, the inner surface and the outer surface of the first arcuate section 50a are bent arcuately. The first arcuate section 50a is in contact with the outer circumferential surface 30a of the top foil 30 in the second surface 49b.

Each of the second support portions 60 protrudes from the first surface 49a of the coupling portions 70 toward the inner circumferential surface 20a of the housing 20. Each of the second support portions 60 is located between two of the coupling portions 70. Each of the second support portions 60 is formed by bending the metal plate 49, which forms the bump foil 40. Each of the second support portions 60 includes a second arcuate section 60a at a distal end in the protruding direction from the coupling portions 70. When the second support portion 60 is viewed in the axial direction A, the inner surface and the outer surface of the second arcuate section 60a are curved arcuately. The second arcuate section 60a is in contact with the inner circumferential surface 20a of the housing 20 in the first surface 49a.

The first support portions 50 and the second support portions 60 are formed to be spaced apart from each other in the metal plate 49, which forms the bump foil 40, so that each of the coupling portions 70 is formed between one of the first support portions 50 and one of the second support portions 60.

Each first bent section 71 is provided at the boundary between one of the first support portions 50 and one of the coupling portions 70, and each second bent section 72 is provided at the boundary between one of the second support portions 60 and one of the coupling portions 70. The first bent sections 71 are formed by bending the metal plate 49 to form the first support portions 50 in the metal plate 49. Each first bent section 71 is formed at a first end of the corresponding coupling portion 70, and each second bent section 72 is formed at a second end of the corresponding coupling portion 70. The first bent section 71, that is, the first end of the coupling portion 70, is bent arcuately to be continuous with the first support portion 50. The second bent section 72, that is, the second end of the coupling portion 70, is bent arcuately to be continuous with the second support portion 60. The first bent section 71 and the second bent section 72 have a dual rate spring structure that generates an elastic force by being bent by receiving a load from the top foil 30. When the rotating body 103 is not rotating, the first bent sections 71 are not in contact with the housing 20 or the top foil 30, and the second bent sections 72 are not in contact with the housing 20 or the top foil 30.

Each coupling portion 70 is inclined such that the first bent section 71 is closer to the housing 20 than the second bent section 72 is. That is, the coupling portion 70 extends from the first bent section 71 toward the second bent section 72 in the rotation direction B so as to gradually approach the top foil 30.

The bump foil 40 includes first boundaries T1 and second boundaries T2. Each first boundary T1 is on the second surface 49b of the metal plate 49 and between one of the coupling portions 70 and one of the first support portions 50. The first boundary T1 is a section of the metal plate 49 that is bent to form the first support portion 50. Each second boundary T2 is on the first surface 49a of the metal plate 49 and between one of the coupling portions 70 and one of the second support portions 60. The second boundary T2 is a section of the metal plate 49 that is bent to form the second support portion 60.

An imaginary line that connects the first boundaries T1 of the bump foils 40 together in the rotation direction B is referred to as an imaginary circle F. The bump foils 40 are disposed in the gap K in an elastically deformed state.

Figure 2:
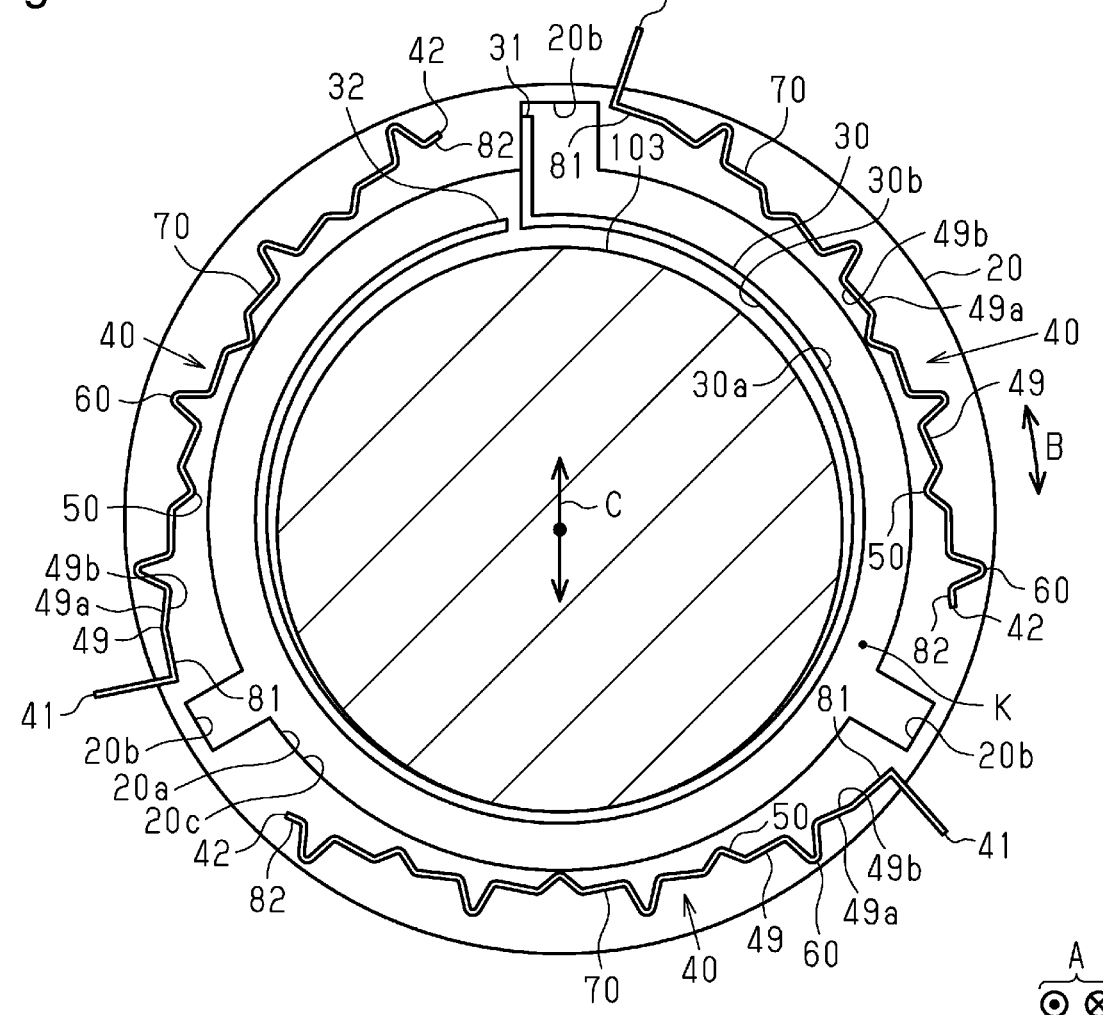
FIG. 2 is a diagram showing a bump foil before being elastically deformed in the foil bearing shown in FIG. 1.

As shown in FIG. 2, the bump foils 40 before being disposed in the gap K, that is, the bump foils 40 before being elastically deformed, each have an arcuate shape close to the shape of a substantially flat plate, when viewed in the axial direction A. The radius of the imaginary circle F of the bump foils 40 before being disposed in the gap K is greater than the radius of the bump foils 40 after being elastically deformed to be disposed in the gap K. Thus, the radius of the arcs of the bump foils 40 after being elastically deformed to be disposed in the gap K is less than the radius of the arcs of the bump foils 40 before being disposed in the gap K. Therefore, each bump foil 40 disposed in the gap K is disposed to be arcuate between the housing 20 and the top foil 30 so that the radius of curvature is reduced.

As shown in FIG. 3, the bump foils 40 disposed in the gap K are urged outward in the radial direction C by the restoring force from the elastically deformed state to the original shape. An urging direction N of each bump foil 40 is a direction from the top foil 30 toward the housing 20.

Each bump foil 40 has its radius of curvature reduced to be disposed in the gap K, as shown in FIG. 4. This generates tensile stress in the first surface 49a of the bump foil 40 as indicated by arrows Y1, and generates compressive stress in the second surface 49b of the bump foil 40 as indicated by arrows Y2.

The dimension in the radial direction C from the first boundary T1 to the outer circumferential surface 30a of the top foil 30 is referred to as a height H1 from the coupling portion 70 of the first support portion 50. The height H1 is the height of the first support portion 50 from the first end of the coupling portion 70 in the radial direction C of the rotating body 103. The height H1 of the first support portion 50 is the length from the first bent section 71 to the distal end of the first support portion 50 in the radial direction C. The dimension in the radial direction C from the second boundary T2 to the inner circumferential surface 20a of the housing 20 is a height H2 from the coupling portion 70 of the second support portion 60. The height H2 is the height of the second support portion 60 from the second end of the coupling portion 70 in the radial direction C of the rotating body 103. The height H2 of the second support portion 60 is the length from the second bent section 72 to the distal end of the second support portion 60 in the radial direction C.

The height H1 of the first support portion 50 is less than the height H2 of the second support portion 60. In other words, the height H2 of the second support portion 60 is greater than height H1 of the first support portion 50. Due to the relationship between the height H1 and the height H2, the coupling portion 70 is located closer to the top foil 30 than the middle position in the radial direction C in the gap K is.

The difference between the height H1 of the first support portion 50 and the height H2 of the second support portion 60 is referred to as ΔH. For the first support portion 50 and the second support portion 60, the resistance to damage when a load is input is defined as a safety factor. The safety factor of the first support portion 50 and the safety factor of the second support portion 60 decrease as the heights H1 and H2 increase, and increase as the heights H1 and H2 decrease. The greater the stress generated when the bump foil 40 is curved, the lower the safety factors of the first support portion 50 and the second support portion 60 become.

The upper limit of the dimension of the gap K, in which the bump foils 40 are disposed, is the dimension when no load is input to the top foil 30. The upper limit of the gap K is determined in advance. Thus, the height H1 and the height H2 are determined by the degree of curvature of the bump foil 40 and the upper limit of the gap K. If one of the height H1 and the height H2 increases, the other one decreases. Thus, as ΔH increases, the safety factor of the support portion having the higher height decreases, and the safety factor of the support portion having the lower height increases.

Specifically, the height H1 of the first support portion 50 is less than height H2 of the second support portion 60. As the height H1 of the first support portion 50 decreases, the safety factor of the first support portion 50 increases. When the height H1 of the first support portion 50 decreases, the height H2 of the second support portion 60 increases, so that the safety factor of the second support portion 60 decreases. The height H1 and the height H2 are set such that the safety factor of the first support portion 50 is equal to the safety factor of the second support portion 60. However, the safety factor of the first support portion 50 and the safety factor of the second support portion 60 may be different from each other if the safety factor of the first support portion 50 and the safety factor of the second support portion 60 are both within a range of desired safety factor and both the first support portion 50 and the second support portion 60 are unlikely to be damaged.

As shown in FIG. 3, the first end plate portion 81 is provided between the proximal end of the fixed end 41 and one of the second support portions 60 of the bump foil 40. The second end plate portion 82 is provided between the free end 42 and one of the second support portions 60 of the bump foil 40.

Deformation of Top Foil and Deformation of Bump Foil

When the centrifugal compressor 100 starts operating, the rotating body 103 rotates. When the rotation speed of the rotating body 103 reaches a prescribed rotation speed, a fluid film is formed between the rotating body 103 and the top foil 30. The dynamic pressure of the fluid film separates the rotating body 103 from the top foil 30. The rotating body 103 is supported by the fluid film in a state of being separated from the top foil 30 in the radial direction Rd.

When the rotating body 103 rotates to form a fluid film, the fluid film elastically deforms the top foil 30 outward in the radial direction C of the housing 20. The outward displacement of the top foil 30 in the radial direction C of the housing 20 inputs a load from the top foil 30 to the first support portions 50. As the load is input to the first support portions 50, a load is input to the second support portions 60.

As the rotation speed of the rotating body 103 increases from the prescribed rotation speed, the load input to the bump foils 40 from the top foil 30 also increases. As the load increases, the top foil 30 pushes the first support portions 50 of the bump foils 40 toward the housing 20.

Figure 5:
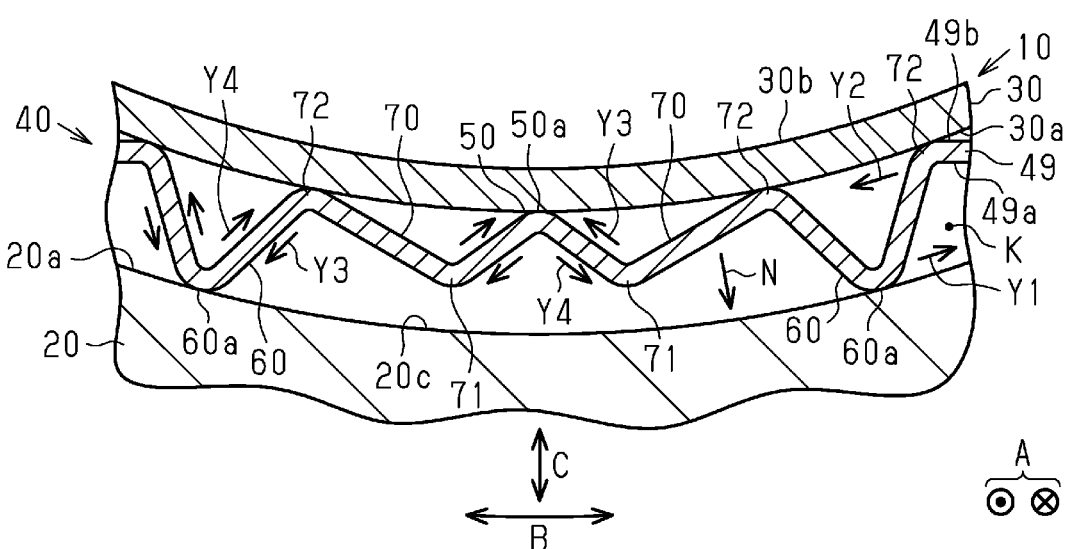
FIG. 5 is a partial cross-sectional view of the bump foil shown in FIG. 2 when the input load reaches the first prescribed value.

In this case, each first support portion 50 is elastically deformed to extend in the rotation direction B as shown in FIG. 5, and the first bent sections 71 and the second bent sections 72 are bent so that the first bent sections 71 gradually approach the inner circumferential surface 20a of the housing 20. At the same time, the second bent sections 72 are bent so as to gradually approach the outer circumferential surface 30a of the top foil 30. That is, an increase in the load input from the top foil 30 to the bump foil 40 bends the opposite ends of each coupling portion 70.

Due to the elastic deformation, compressive stress is generated in the radially inner surface of each first support portion 50, which faces the top foil 30, as indicated by arrows Y3, and tensile stress is generated in the radially outer surface of each first support portion 50, which faces the housing 20, as indicated by arrows Y4. Simultaneously, tensile stress is generated in the radially inner surface of each second support portion 60, which faces the top foil 30, as indicated by arrows Y4, and compressive stress is generated in the radially outer surface of each second support portion 60, which faces the housing 20, as indicated by arrows Y3. That is, as indicated by arrows Y2 and arrows Y3, the compressive stress due to elastic deformation of the bump foil 40 and the compressive stress due to the input of load are generated in the radially inner surface of each first support portion 50. Simultaneously, as indicated by arrows Y1 and arrows Y4, the tensile stress due to elastic deformation of the bump foil 40 and the tensile stress due to the input of load are generated in the radially outer surface of each first support portion 50. That is, in each first support portion 50, the stress generated by the curving of the bump foil 40 and the stress generated by the input of the load agree with each other in the compression direction or the tension direction.

As shown in FIG. 5, when the load input to the bump foil 40 from the top foil 30 reaches a first prescribed value, the second bent sections 72, which are the second ends of the coupling portions 70, contact the outer circumferential surface 30a of the top foil 30. That is, the second bent sections 72, which are the second ends of the coupling portions 70, contact the outer circumferential surface 30a of the top foil 30 so as to function as additional first support portions 50. The second end of each coupling portion 70 is a first section, which is configured to function as an additional first support portion 50. Until the load reaches the first prescribed value, the outer circumferential surface 30a of the top foil 30 and the bump foils 40 contact each other only at the first support portions 50. However, when the load reaches the first prescribed value, the outer circumferential surface 30a of the top foil 30 and the bump foils 40 contact each other at the first support portions 50 and the second bent sections 72. That is, an increase in the load input from the rotating body 103 increases the number of the first support portions 50 contact the outer circumferential surface 30a of the top foil 30.

When the load reaches the first prescribed value, the load is supported not only by the first support portions 50 and the second support portions 60, but also by the second bent sections 72. At this time, since the first bent sections 71 are not in contact with the housing 20, stress does not concentrate at the first bent sections 71.

Figure 6:
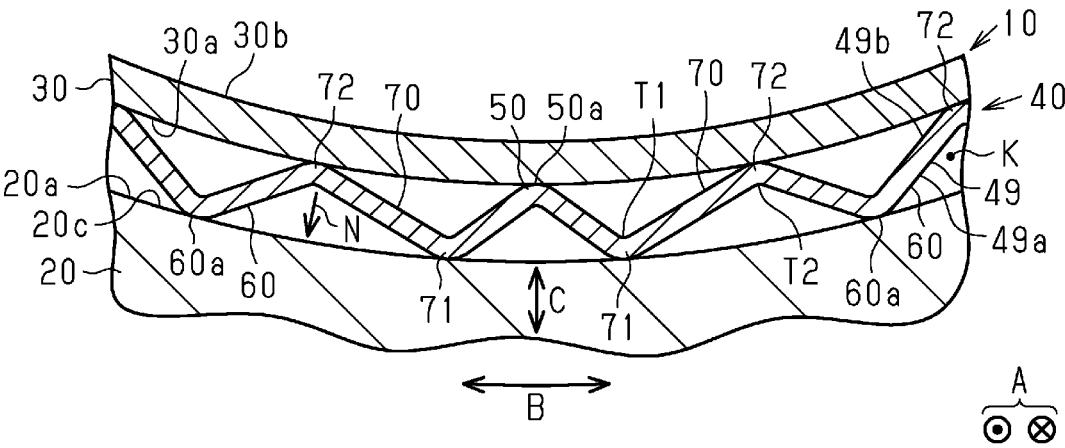
FIG. 6 is a partial cross-sectional view of the bump foil shown in FIG. 2 when the input load reaches a second prescribed value.

When the load input to the bump foil 40 from the top foil 30 further increases and exceeds the first prescribed value, the first support portions 50 and the second support portions 60 are elastically deformed to extend in the rotation direction B, and the first bent sections 71 and the second bent sections 72 are bent further as shown in FIG. 6. When the load reaches a second prescribed value, the first bent sections 71 contact the inner circumferential surface 20a of the housing 20. That is, the first bent sections 71, which are the first ends of the coupling portions 70, contact the inner circumferential surface 20a of the housing 20 so as to function as additional second support portions 60. The first end of each coupling portion 70 is a second section, which is configured to function as an additional second support portion 60. As a result, an increase in the load input from the rotating body 103 increases the number of the second support portions 60 contact the inner circumferential surface 20a of the housing 20. Thus, when the load input from the rotating body 103 increases, the bump foils 40 are deformed such that, after the number of the first support portions 50 that contact the outer circumferential surface 30a of the top foil 30 increases, the number of the second support portions 60 that contact the inner circumferential surface 20a of the housing 20 increases. Accordingly, the load input from the rotating body 103 is supported by the first support portions 50, the second support portions 60, the first bent sections 71, and the second bent sections 72.

The first embodiment has the following advantages.

(1-1) An increase in the load input to the foil bearing 10 from the rotating body 103 increases the number of the first support portions 50 that contact the outer circumferential surface 30a of the top foil 30, as compared to the state before the increase in the load. A further increase in the load input to the foil bearing 10 from the rotating body 103 increases the number of the second support portions 60 that contact the inner circumferential surface 20a of the housing 20. This increases the number of portions capable of supporting the load, thereby preventing the reliability of each of the first support portions 50 and the second support portions 60 from being decreased.

(1-2) When the load input to the foil bearing 10 from the rotating body 103 increases, the second bent sections 72 function as additional first support portions 50. The load is thus supported not only by the first support portions 50, but also by the second bent sections 72. Thereafter, the first bent sections 71 function as additional second support portions 60. This allows the opposite ends of each coupling portion 70 to be used to support the load. Accordingly, the stress generated in each first support portion 50 is reduced as compared with the conventional technique, in which the number of the first support portions that contact the outer circumferential surface of the top foil and the number of the second support portions that contact the inner circumferential surface of the housing are increased simultaneously. This readily suppresses damage to each first support portion 50, in which the stress generated by curving the bump foil 40 and the stress generated by the input of a load agree with each other in the compression direction or the tension direction.

(1-3) The height H1 of the first support portion 50 is less than the height H2 of the second support portion 60. Thus, when the load input from the top foil 30 to the bump foil 40 increases so that the opposite ends of each coupling portion 70 are bent, the second bent sections 72, which are bent toward the first support portions 50, which have a relatively low height, contact the outer circumferential surface 30a of the top foil 30 before the first bent sections 71, which are bent toward the second support portions 60, contact the inner circumferential surface 20a of the housing 20. The second bent sections 72 are allowed to contact the top foil 30 so as to function as additional first support portions 50.

(1-4) The foil bearing 10 includes three bump foils 40, and the radius of curvature of each bump foil 40 is reduced. Thus, for example, as compared to a case in which only one bump foil 40 is used, self-excited vibration in each bump foil 40 is suppressed.

(1-5) Times at which the support portions 50 contact the outer circumferential surface 30a of the top foil 30 are displaced from each other even though the stress generated by a decrease in radius of curvature of the bump foil 40 and the stress generated by the input of a load agree with each other in the compression direction or the tension direction. This readily suppresses damage to the top foil 30.

Second Embodiment

A foil bearing 10 according to a second embodiment will now be described with reference to FIG. 7. In the second embodiment, detailed description of portions similar to those of the first embodiment will be omitted.

As in the first embodiment, the urging direction N of each bump foil 40 is a direction from the top foil 30 toward the housing 20.

Figure 7:
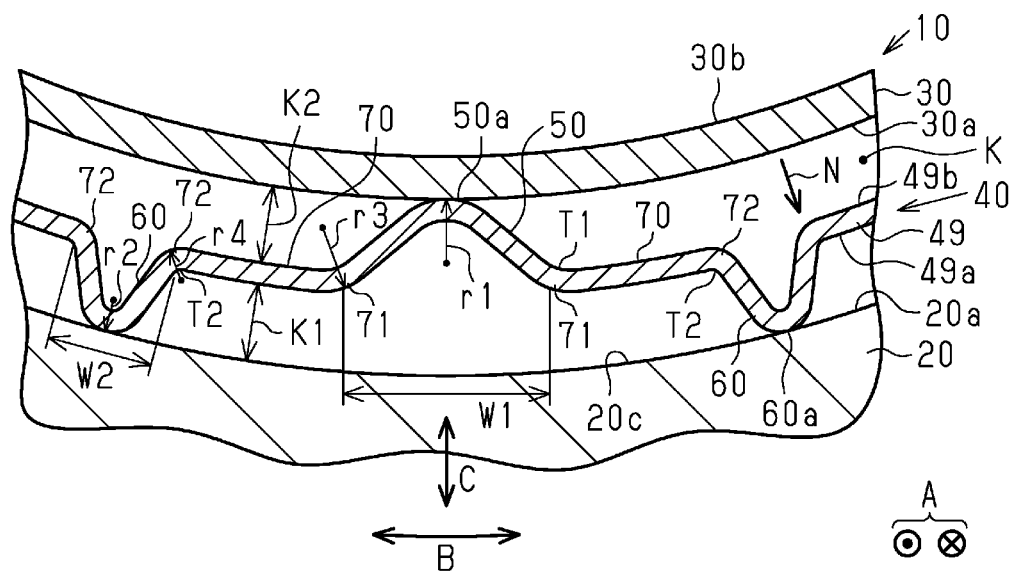
FIG. 7 is a partial cross-sectional view of a bump foil according to a second embodiment.

As shown in FIG. 7, each coupling portion 70 is located at a middle position in the radial direction C in the gap K between the inner circumferential surface 20a of the housing 20 and the outer circumferential surface 30a of the top foil 30. The distance between the first surface 49a of the coupling portion 70 and the inner circumferential surface 20a of the housing 20 is referred to as a distance K1. The distance between the second surface 49b of the coupling portion 70 and the outer circumferential surface 30a of the top foil 30 is referred to as a distance K2. The distance K1 is equal to the distance K2.

The first arcuate section 50a of each first support portion 50 has an arc radius r1. The second arcuate section 60a of each second support portion 60 has an arc radius r2. The arc radius r2 of the second arcuate section 60a is less than the arc radius r1 of the first arcuate section 50a. Thus, when a load is input, the second support portion 60 is less likely to spread in the rotation direction B than the first support portion 50.

The dimension in the rotational direction B of each first support portion 50 is referred to as a width W1. The width W1 of each first support portion 50 is the distance between the first bent sections 71 at the opposite ends in the rotation direction B of the first support portion 50. The dimension in the rotational direction B of each second support portion 60 is referred to as a width W2. The width W2 of each second support portion 60 is the distance between the second bent sections 72 at the opposite ends in the rotation direction B of the second support portion 60. Since the arc radius r2 of the second support portion 60 is less than the arc radius r1 of the first support portion 50, the width W2 is less than the width W1. Each first bent section 71 is an arc having an arc radius r3. Each second bent section 72 is an arc having an arc radius r4.

The arc radius r3 of each first bent section 71 is greater than the arc radius r4 of each second bent section 72. In other words, the arc radius r4 of each second bent section 72 is less than the arc radius r3 of each first bent section 71. Thus, when a load is input, the first bent sections 71 are more likely to bend than the second bent sections 72.

Deformation of Top Foil and Deformation of Bump Foil

When the load input to the bump foil 40 from the top foil 30 is less than a first prescribed value, the first bent sections 71 are not in contact with the outer circumferential surface 30a of the top foil 30, and the second bent sections 72 are not in contact with the inner circumferential surface 20a of the housing 20.

The arc radius r1 of the first arcuate section 50a of each first support portion 50 is greater than the arc radius r2 of the second arcuate section 60a of each second support portion 60, and the arc radius r3 of each first bent section 71 is greater than the arc radius r4 of each second bent section 72. Thus, the first support portions 50 are more likely to be elastically deformed than the second support portions 60, and the first bent sections 71 are more likely to bend than the second bent sections 72. Therefore, when the load reaches the first prescribed value, the first support portions 50 are deformed to extend in the rotation direction B by a greater amount than the second support portions 60, and the first bent sections 71 bend by a greater amount than the second bent sections 72.

As a result, as shown in FIG. 5, when the load input to the bump foil 40 from the top foil 30 reaches the first prescribed value, the second bent sections 72 contact the outer circumferential surface 30a of the top foil 30. That is, the second bent sections 72, which are the second ends of the coupling portions 70, contact the outer circumferential surface 30a of the top foil 30 so as to function as additional first support portions 50. Until the load reaches the first prescribed value, the outer circumferential surface 30a of the top foil 30 and the bump foils 40 contact each other only at the first support portions 50. However, when the load reaches the first prescribed value, the outer circumferential surface 30a of the top foil 30 and the bump foils 40 contact each other at the first support portions 50 and the second bent sections 72. That is, an increase in the load input from the rotating body 103 increases the number of the first support portions 50 contact the outer circumferential surface 30a of the top foil 30.

When the load reaches the first prescribed value, the load is supported not only by the first support portions 50 and the second support portions 60, but also by the second bent sections 72. At this time, since the first bent sections 71 are not in contact with the housing 20, stress does not concentrate at the first bent sections 71.

When the load input to the bump foil 40 from the top foil 30 further increases and exceeds the first prescribed value, the first support portions 50 and the second support portions 60 are elastically deformed to extend further in the rotation direction B, and the first bent sections 71 and the second bent sections 72 bend further. When the load reaches a second prescribed value, the first bent sections 71 contact the inner circumferential surface 20a of the housing 20 as shown in FIG. 6. That is, the first bent sections 71, which are the first ends of the coupling portions 70, contact the inner circumferential surface 20a of the housing 20 so as to function as additional second support portions 60. As a result, an increase in the load input from the rotating body 103 increases the number of the second support portions 60 contact the inner circumferential surface 20a of the housing 20. Thus, when the load input from the rotating body 103 increases, the bump foils 40 are deformed such that, after the number of the first support portions 50 that contact the outer circumferential surface 30a of the top foil 30 increases, the number of the second support portions 60 that contact the inner circumferential surface 20a of the housing 20 increases.

In addition to the advantages (1-1), (1-2), (1-4), and (1-5) of the first embodiment, the second embodiment achieves the following advantages.

(2-1) The arc radius r3 of each first bent section 71 is greater than the arc radius r4 of each second bent section 72. Since the first bent sections 71 are more likely to bend than the second bent sections 72, the second bent sections 72 contact the outer circumferential surface 30a of the top foil 30 before the first bent sections 71 contact the inner circumferential surface 20a of the housing 20. The second bent sections 72 are allowed to contact the top foil 30 so as to function as additional first support portions 50. After the second bent sections 72 contact the top foil 30 so as to function as additional first support portions 50, an increase in the load causes the first bent sections 71 to contact the housing 20 so as to function as additional second support portions 60.

Third Embodiment

A foil bearing 10 according to a third embodiment will now be described with reference to FIGS. 8 to 11. In the third embodiment, detailed description of portions similar to those of the first embodiment will be omitted.

Figures 8, 9:
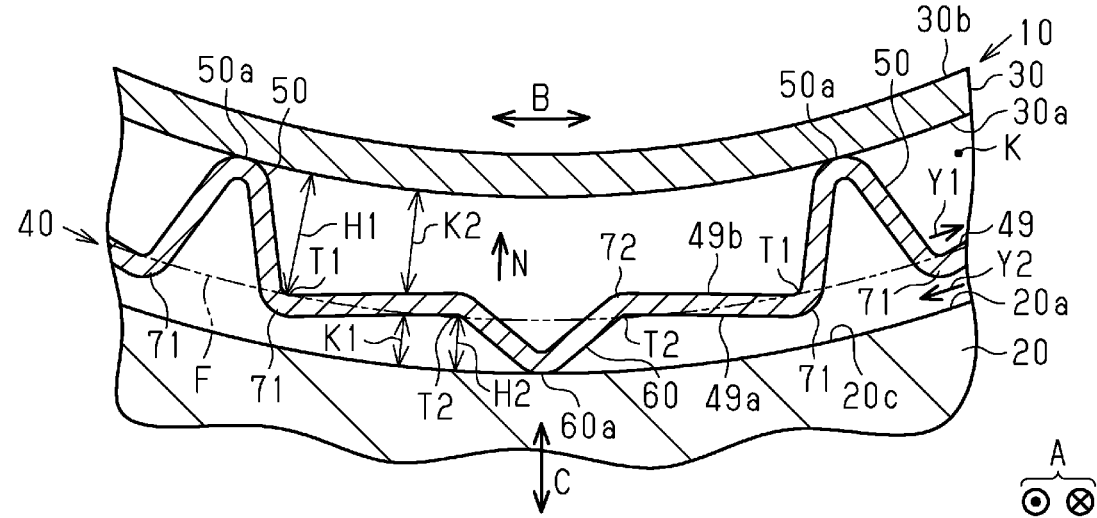
FIG. 8 is a cross-sectional view of the bump foil shown in FIG. 7, before being elastically deformed.
FIG. 9 is a partial cross-sectional view of a bump foil according to a third embodiment.

As shown in FIG. 8, the bump foils 40 before being disposed in the gap K, that is, the bump foils 40 before being elastically deformed, each have an arcuate shape when viewed in the axial direction A. The radius of the imaginary circle F of the bump foils 40 before being disposed in the gap K is less than the radius of the bump foils 40 after being elastically deformed to be disposed in the gap K. Thus, the radius of the arcs of the bump foils 40 after being elastically deformed to be disposed in the gap K is greater than the radius of the arcs of the bump foils 40 before being disposed in the gap K. Therefore, each bump foil 40 disposed in the gap K is disposed to be arcuate between the housing 20 and the top foil 30 so that the radius of curvature is increased.

As shown in FIG. 9, each bump foil 40 is disposed in the gap K in a curved state such that the radius of the arc is greater than before the bump foil 40 is disposed in the gap K. The bump foils 40 disposed in the gap K are urged inward in the radial direction C by the restoring force from the elastically deformed state to the original shape. An urging direction N of each bump foil 40 is a direction from the housing 20 toward the top foil 30.

Each bump foil 40 has its radius of curvature increased to be disposed in the gap K. This generates tensile stress in the second surface 49b of the bump foil 40 as indicated by arrows Y1, and generates compressive stress in the first surface 49a of the bump foil 40 as indicated by arrows Y2.

The dimension in the radial direction C from the first boundary T1 to the outer circumferential surface 30a of the top foil 30 is referred to as a height H1 from the coupling portion 70 of the first support portion 50. The height H1 is the height of the first support portion 50 from the first end of the coupling portion 70 in the radial direction C of the rotating body 103. The dimension in the radial direction C from the second boundary T2 to the inner circumferential surface 20a of the housing 20 is a height H2 from the coupling portion 70 of the second support portion 60. The height H2 is the height of the second support portion 60 from the second end of the coupling portion 70 in the radial direction C of the rotating body 103.

The height H1 of the first support portion 50 is greater than the height H2 of the second support portion 60. In other words, the height H2 of the second support portion 60 is less than height H1 of the first support portion 50. Due to the relationship between the height H1 and the height H2, the coupling portion 70 is located closer to the housing 20 than the middle position in the radial direction C in the gap K is.

Deformation of Top Foil and Deformation of Bump Foil

As the rotation speed of the rotating body 103 increases from the prescribed rotation speed, the load input to the bump foils 40 from the top foil 30 also increases. As the load increases, the top foil 30 pushes the first support portions 50 of the bump foils 40 toward the housing 20.

Figure 10:
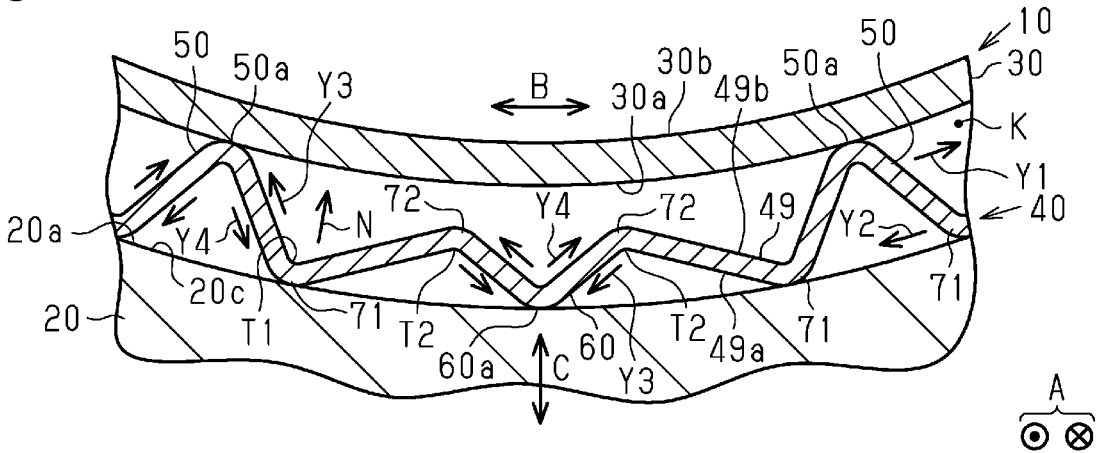
FIG. 10 is a partial cross-sectional view of the bump foil shown in FIG. 9 when an input load reaches a first prescribed value.

In this case, each first support portion 50 and each support portion 60 are elastically deformed to extend in the rotation direction B as shown in FIG. 10, and the first bent sections 71 and the second bent sections 72 are bent so that the first bent sections 71 gradually approach the inner circumferential surface 20a of the housing 20. At the same time, the second bent sections 72 are bent so as to gradually approach the outer circumferential surface 30a of the top foil 30.

Due to the elastic deformation, compressive stress is generated in the radially inner surface of each first support portion 50 as indicated by arrows Y3, and tensile stress is generated in the radially outer surface of each first support portion 50 as indicated by arrows Y4. Simultaneously, tensile stress is generated in the radially inner surface of each second support portion 60 as indicated by arrows Y4, and compressive stress is generated in the radially outer surface of each second support portion 60 as indicated by arrows Y3. That is, as indicated by arrows Y1 and arrows Y4, the tensile stress due to elastic deformation of the bump foil 40 and the tensile stress due to the input of load are generated in the radially inner surface of each second support portion 60. Simultaneously, as indicated by arrows Y2 and arrows Y3, the compressive stress due to elastic deformation of the bump foil 40 and the compressive stress due to the input of load are generated in the radially outer surface of each second support portion 60. That is, in each second support portion 60, the stress generated by the curving of the bump foil 40 and the stress generated by the input of the load agree with each other in the compression direction or the tension direction.

When the load input to the bump foil 40 from the top foil 30 reaches the first prescribed value, the first bent sections 71 contact the inner circumferential surface 20a of the housing 20, as shown in FIG. 10. That is, the first bent sections 71, which are the first ends of the coupling portions 70, contact the inner circumferential surface 20a of the housing 20 so as to function as additional second support portions 60. Until the load reaches the first prescribed value, the inner circumferential surface 20a of the housing 20 and the bump foils 40 contact each other only at the second support portions 60. However, when the load reaches the first prescribed value, the inner circumferential surface 20a of the housing 20 and the bump foils 40 contact each other at the second support portions 60 and the first bent sections 71. In other words, an increase in the load input from the rotating body 103 increases the number of the second support portions 60 contact the inner circumferential surface 20a of the housing 20.

When the load reaches the first prescribed value, the load is supported not only by the first support portions 50 and the second support portions 60, but also by the first bent sections 71. At this time, since the second bent sections 72 are not in contact with the top foil 30, stress does not concentrate at the second bent sections 72.

When the load input to the bump foil 40 from the top foil 30 further increases and exceeds the first prescribed value, the first support portions 50 and the second support portions

Figure 11:
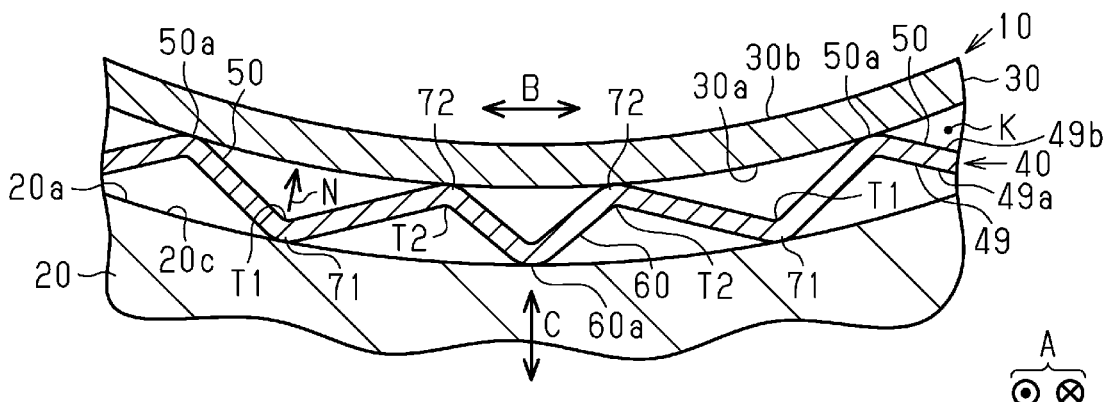
FIG. 11 is a partial cross-sectional view of the bump foil shown in FIG. 9 when an input load reaches a second prescribed value.

60 are elastically deformed to extend in the rotation direction B, and the first bent sections 71 and the second bent sections 72 are bent further as shown in FIG. 11. When the load reaches a second prescribed value, the second bent sections 72 contact the outer circumferential surface 30$a$ of the top foil 30. That is, the second bent sections 72, which are the second ends of the coupling portions 70, contact the outer circumferential surface 30$a$ of the top foil 30 so as to function as additional first support portions 50. As a result, an increase in the load input from the rotating body 103 increases the number of the first support portions 50 contact the outer circumferential surface 30$a$ of the top foil 30. Thus, when the load input from the rotating body 103 increases, the bump foils 40 are deformed such that, after the number of the second support portions 60 that contact the inner circumferential surface 20$a$ of the housing 20 increases, the number of the first support portions 50 that contact the outer circumferential surface 30$a$ of the top foil 30 increases. Accordingly, the load input from the rotating body 103 is supported by the first support portions 50, the second support portions 60, the first bent sections 71, and the second bent sections 72.

In addition to the advantages (1-1) and (1-4) of the first embodiment, the third embodiment achieves the following advantages.

(3-1) When the load input to the foil bearing 10 from the rotating body 103 increases, the first bent sections 71 function as additional second support portions 60. The load is thus supported not only by the second support portions 60, but also by the first bent sections 71. Thereafter, the second bent sections 72 function as additional first support portions 50. This allows the opposite ends of each coupling portion 70 to be used to support the load. Accordingly, the stress generated in each second support portion 60 is reduced as compared with the conventional technique, in which the number of the first support portions that contact the outer circumferential surface of the top foil and the number of the second support portions that contact the inner circumferential surface of the housing are increased simultaneously. This readily suppresses damage to each second support portion 60, in which the stress generated by curving the bump foil 40 and the stress generated by the input of a load agree with each other in the compression direction or the tension direction.

(3-2) The height H2 of the second support portion 60 is less than height H1 of the first support portion 50. When the load input from the top foil 30 to the bump foil 40 increases so that the opposite ends of each coupling portion 70 are bent, the first bent sections 71, which are bent toward the second support portions 60, which have a relatively low height, contact the inner circumferential surface 20$a$ of the housing 20 before the second bent sections 72, which are bent toward the first support portions 50, contact the outer circumferential surface 30$a$ of the top foil 30. The first bent sections 71 are allowed to contact the housing 20 so as to function as additional second support portions 60. After the first bent sections 71 contact the housing 20 so as to function as additional second support portions 60, an increase in the load causes the second bent sections 72 to contact the top foil 30 so as to function as additional first support portions 50.

Fourth Embodiment

Figure 12:
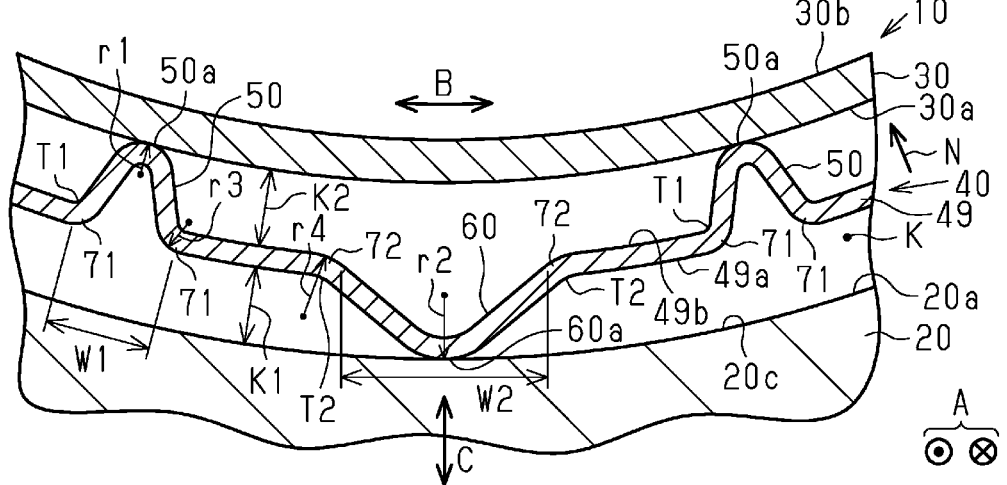
FIG. 12 is a partial cross-sectional view of a bump foil according to a fourth embodiment.

A foil bearing 10 according to a fourth embodiment will now be described with reference to FIG. 12. In the fourth embodiment, detailed description of portions similar to those of the third embodiment will be omitted.

As in the third embodiment, the urging direction N of each bump foil 40 is a direction from the housing 20 toward the top foil 30.

Each coupling portion 70 is located at a middle position in the radial direction C in the gap K between the inner circumferential surface 20$a$ of the housing 20 and the outer circumferential surface 30$a$ of the top foil 30. The distance between the first surface 49$a$ of the coupling portion 70 and the inner circumferential surface 20$a$ of the housing 20 is referred to as a distance K1. The distance between the second surface 49$b$ of the coupling portion 70 and the outer circumferential surface 30$a$ of the top foil 30 is referred to as a distance K2. The distance K1 is equal to the distance K2.

The first arcuate section 50$a$ of each first support portion 50 has an arc radius r1. The second arcuate section 60$a$ of each second support portion 60 has an arc radius r2. The arc radius r2 of the second arcuate section 60$a$ is greater than the arc radius r1 of the first arcuate section 50$a$. That is, the arc radius r1 of the first arcuate section 50$a$ is less than the arc radius r2 of the second arcuate section 60$a$. Thus, when a load is input, the second support portion 60 is more likely to spread in the rotation direction B than the first support portion 50. The width W2 of the second support portion 60 is greater than the width W1 of the first support portion 50.

Each first bent section 71 is an arc having an arc radius r3. Each second bent section 72 is an arc having an arc radius r4. The arc radius r3 of each first bent section 71 is less than the arc radius r4 of each second bent section 72. Thus, when a load is input, the second bent sections 72 are more likely to bend than the first bent sections 71.

Deformation of Top Foil and Deformation of Bump Foil

When the load input to the bump foil 40 from the top foil 30 is less than a first prescribed value, the first bent sections 71 are not in contact with the outer circumferential surface 30$a$ of the top foil 30, and the second bent sections 72 are not in contact with the inner circumferential surface 20$a$ of the housing 20.

The arc radius r1 of the first arcuate section 50$a$ of each first support portion 50 is less than the arc radius r2 of the second arcuate section 60$a$ of each second support portion 60, and the arc radius r4 of each second bent section 72 is greater than the arc radius r3 of each first bent section 71. Thus, the second support portions 60 are more likely to be elastically deformed than the first support portions 50, and the second bent sections 72 are more likely to bend than the first bent sections 71. Therefore, when the load reaches the first prescribed value, the second support portions 60 are deformed to extend in the rotation direction B by a greater amount than the first support portions 50, and the second bent sections 72 bend by a greater amount than the first bent sections 71.

As a result, when the load reaches a first prescribed value, the first bent sections 71 contact the inner circumferential surface 20$a$ of the housing 20 as shown in FIG. 10. That is, the first bent sections 71, which are the first ends of the coupling portions 70, contact the inner circumferential surface 20$a$ of the housing 20 so as to function as additional second support portions 60. Until the load reaches the first prescribed value, the inner circumferential surface 20$a$ of the housing 20 and the bump foils 40 contact each other only at the second support portions 60. However, when the load reaches the first prescribed value, the inner circumferential surface 20$a$ of the housing 20 and the bump foils 40 contact each other at the second support portions 60 and the first bent sections 71. Thus, when the load reaches the first prescribed value, the load is supported not only by the first support portions 50 and the second support portions 60, but also by the first bent sections 71. At this time, since the second bent sections 72 are not in contact with the top foil 30, stress does not concentrate at the second bent sections 72.

When the load input to the bump foil 40 from the top foil 30 further increases and exceeds the first prescribed value, the first support portions 50 and the second support portions 60 are elastically deformed to extend in the rotation direction B, and the first bent sections 71 and the second bent sections 72 bend further. Then, as shown in FIG. 11, the second bent sections 72 contact the outer circumferential surface 30*a* of the top foil 30. As a result, the load input from the rotating body 103 is supported by the first support portions 50, the second support portions 60, the first bent sections 71, and the second bent sections 72.

In addition to the advantages (1-1) and (1-4) of the first embodiment and the advantage (3-1) of the third embodiment, the fourth embodiment achieves the following advantage.

(4-1) The arc radius r4 of each second bent section 72 is greater than the arc radius r3 of each first bent section 71. Since the second bent sections 72 are more likely to bend than the first bent sections 71, the first bent sections 71 contact the inner circumferential surface 20*a* of the housing 20 before the second bent sections 72 contact the outer circumferential surface 30*a* of the top foil 30. The first bent sections 71 are allowed to contact the housing 20 so as to function as additional second support portions 60. After the first bent sections 71 contact the housing 20 so as to function as additional second support portions 60, an increase in the load causes the second bent sections 72 to contact the top foil 30 so as to function as additional first support portions 50.

The above-described embodiments may be modified as follows. The above-described embodiments and the following modifications can be combined as long as the combined modifications remain technically consistent with each other.

Each coupling portion 70 does not necessarily need to be inclined such that the first bent section 71 is closer to the top foil 30 than the second bent section 72 is. That is, the coupling portion 70 may extend in the rotation direction B without being inclined.

The bump foil 40 according to the first embodiment may be configured such that the arc radius r2 of the second arcuate section 60*a* of the second support portion 60 is less than the arc radius r1 of the first arcuate section 50*a* of the first support portion 50, and the arc radius r4 of the second bent section 72 is less than the arc radius r3 of the first bent section 71.

The bump foil 40 according to the third embodiment may be configured such that the arc radius r1 of the first arcuate section 50*a* of the first support portion 50 is less than the arc radius r2 of the second arcuate section 60*a* of the second support portion 60, and the arc radius r3 of the first bent section 71 is less than the arc radius r4 of the second bent section 72.

In each bump foil 40, the number of the first support portions 50 and the number of the second support portions 60 may be changed.

Each foil bearing 10 has three bump foils 40, but may have a single substantially cylindrical bump foil 40. In this case, the housing 20 may include only one holding groove 20*b*. The number of the first support portions 50 and the number of the second support portions 60 are changed to any numbers that allow the bump foils 40 to elastically support the top foil 30.

The bump foil 40 does not necessarily need to include the first end plate portion 81 and the second end plate portion 82.

The foil bearing 10 does not necessarily need to support the rotating body 103 of the centrifugal compressor 100 in the radial direction Rd. The apparatus in which the foil bearing 10 is employed may be changed.

Various changes in form and details may be made to the examples above without departing from the spirit and scope of the claims and their equivalents. The examples are for the sake of description only, and not for purposes of limitation. Descriptions of features in each example are to be considered as being applicable to similar features or aspects in other examples. Suitable results may be achieved if sequences are performed in a different order, and/or if components in a described system, architecture, device, or circuit are combined differently, and/or replaced or supplemented by other components or their equivalents. The scope of the disclosure is not defined by the detailed description, but by the claims and their equivalents. All variations within the scope of the claims and their equivalents are included in the disclosure.

What is claimed is:

1. A foil bearing, comprising:

a housing that includes an insertion hole into which a rotating body is inserted;

a top foil that includes a bearing surface facing the rotating body; and a bump foil, wherein the bump foil includes:

first support portions configured to contact an outer circumferential surface of the top foil;

second support portions configured to contact an inner circumferential surface of the housing; and coupling portions that couple the first support portions and the second support portions together such that the first support portions and the second support portions are disposed alternately in a rotation direction of the rotating body, the bump foil is disposed to be arcuate between the housing and the top foil, the bump foil is configured to elastically support the top foil, the coupling portions each include:

a first end coupled to the corresponding first support portion; and a second end coupled to the corresponding second support portion, the bump foil is disposed such that a height of each first support portion from the first end of the corresponding coupling portion in a radial direction of the rotating body is less than a height of each second support portion from the second end of the corresponding coupling portion in the radial direction of the rotating body, the bump foil is configured such that, when a load input from the rotating body increases, the bump foil is deformed to increase (i) a number of the first support portions that contact the outer circumferential surface of the top foil and (ii) a number of the second support portions that contact the inner circumferential surface of the housing, the bump foil is configured such that, when the load input from the rotating body increases, the bump foil is deformed to increase one of: (i) the number of the first support portions that contact the outer circumferential surface of the top foil, and (ii) the number of the second support portions that contact the inner circumferential surface of the housing, before increasing the other one of (i) the number of the first support portions and (ii) the number of the second support portions, the bump foil is configured such that, when the load input from the rotating body increases, the first end of each coupling portion contacts the inner circumferential surface of the housing so as to function as an additional 10 second support portion, and the second end of the coupling portion contacts the outer circumferential surface of the top foil so as to function as an additional first support portion, and the bump foil is configured such that, when the load input from the rotating body increases, the second end of each coupling portion contacts the outer circumferential surface of the top foil before the first end of the coupling portion contacts the inner circumferential surface of the housing.

2. The foil bearing according to claim 1, wherein the bump foil is configured such that when the load input to the bump foil increases to a first prescribed value, the bump foil is deformed to increase the number of the first support portions that contact the outer circumferential surface of the top foil, and when the load input to the bump foil increases to a second prescribed value being greater than the first prescribed value, the bump foil is deformed to increase the number of the second support portions that contact the inner circumferential surface of the housing.

3. A foil bearing, comprising:

a housing that includes an insertion hole into which a rotating body is inserted;

a top foil that includes a bearing surface facing the rotating body; and a bump foil, wherein the bump foil includes:

first support portions configured to contact an outer circumferential surface of the top foil; 40 second support portions configured to contact an inner circumferential surface of the housing; and coupling portions that couple the first support portions and the second support portions together such that the first support portions and the second support portions are disposed alternately in a rotation direction of the rotating body, the bump foil is disposed to be arcuate between the housing and the top foil, the bump foil is configured to elastically support the top foil, the coupling portions each include:

a first end coupled to the corresponding first support portion; and a second end coupled to the corresponding second support portion, the first end of each coupling portion is bent arcuately to the corresponding first support portion, the second end of each coupling portion is bent arcuately to the corresponding second support portion, the bump foil is disposed such that an arc radius of the first end of each coupling portion is greater than an arc radius of the second end of the coupling portion, the bump foil is configured such that, when a load input from the rotating body increases, the bump foil is deformed to increase (i) a number of the first support portions that contact the outer circumferential surface of the top foil and (ii) a number of the second support portions that contact the inner circumferential surface of the housing, the bump foil is configured such that, when the load input from the rotating body increases, the bump foil is deformed to increase one of: (i) the number of the first support portions that contact the outer circumferential surface of the top foil, and (ii) the number of the second support portions that contact the inner circumferential surface of the housing, before increasing the other one of (i) the number of the first support portions and (ii) the number of the second support portions, the bump foil is configured such that, when the load input from the rotating body increases, the first end of each coupling portion contacts the inner circumferential surface of the housing so as to function as an additional second support portion, and the second end of the coupling portion contacts the outer circumferential surface of the top foil so as to function as an additional first support portion, and the bump foil is configured such that, when the load input from the rotating body increases, the second end of each coupling portion contacts the outer circumferential surface of the top foil before the first end of the coupling portion contacts the inner circumferential surface of the housing.

4. A foil bearing, comprising:

a housing that includes an insertion hole into which a rotating body is inserted;

a top foil that includes a bearing surface facing the rotating body; and a bump foil, wherein the bump foil includes:

first support portions configured to contact an outer circumferential surface of the top foil;

second support portions configured to contact an inner circumferential surface of the housing; and coupling portions that couple the first support portions and the second support portions together such that the first support portions and the second support portions are disposed alternately in a rotation direction of the rotating body, the bump foil is disposed to be arcuate between the housing and the top foil, the bump foil is configured to elastically support the top foil, the coupling portions each include:

a first end coupled to the corresponding first support portion; and a second end coupled to the corresponding second support portion, the bump foil is disposed such that a height of each second support portion from the second end of the corresponding coupling portion in a radial direction of the rotating body is less than a height of each first support portion from the first end of the corresponding coupling portion in the radial direction of the rotating body, the bump foil is configured such that, when a load input from the rotating body increases, the bump foil is deformed to increase (i) a number of the first support portions that contact the outer circumferential surface of the top foil and (ii) a number of the second support portions that contact the inner circumferential surface of the housing, the bump foil is configured such that, when the load input from the rotating body increases, the bump foil is deformed to increase one of: (i) the number of the first support portions that contact the outer circumferential surface of the top foil, and (ii) the number of the second support portions that contact the inner circumferential surface of the housing, before increasing the other one of the number of (i) the first support portions and (ii) the number of the second support portions, the bump foil is configured such that, when the load input from the rotating body increases, the first end of each coupling portion contacts the inner circumferential surface of the housing so as to function as an additional second support portion, and the second end of the coupling portion contacts the outer circumferential surface of the top foil so as to function as an additional first support portion, and the bump foil is configured such that, when the load input from the rotating body increases, the first end of each coupling portion contacts the inner circumferential surface of the housing before the second end of the coupling portion contacts the outer circumferential surface of the top foil.

5. A foil bearing, comprising:

a housing that includes an insertion hole into which a rotating body is inserted;

a top foil that includes a bearing surface facing the rotating body; and a bump foil, wherein the bump foil includes:

first support portions configured to contact an outer circumferential surface of the top foil;

second support portions configured to contact an inner circumferential surface of the housing; and coupling portions that couple the first support portions and the second support portions together such that the first support portions and the second support portions are disposed alternately in a rotation direction of the rotating body, the bump foil is disposed to be arcuate between the housing and the top foil, the bump foil is configured to elastically support the top foil, the coupling portions each include:

a first end coupled to the corresponding first support portion; and a second end coupled to the corresponding second support portion, the first end of each coupling portion is bent arcuately to the corresponding first support portion, the second end of each coupling portion is bent arcuately to the corresponding second support portion, the bump foil is disposed such that an arc radius of the second end of each coupling portion is greater than an arc radius of the first end of the coupling portion, the bump foil is configured such that, when a load input from the rotating body increases, the bump foil is deformed to increase (i) a number of the first support portions that contact the outer circumferential surface of the top foil and (ii) a number of the second support portions that contact the inner circumferential surface of the housing, the bump foil is configured such that, when the load input from the rotating body increases, the bump foil is deformed to increase one of: (i) the number of the first support portions that contact the outer circumferential surface of the top foil, and (ii) the number of the second support portions that contact the inner circumferential surface of the housing, before increasing the other one of the number of (i) the first support portions and (ii) the number of the second support portions, the bump foil is configured such that, when the load input from the rotating body increases, the first end of each coupling portion contacts the inner circumferential surface of the housing so as to function as an additional second support portion, and the second end of the coupling portion contacts the outer circumferential surface of the top foil so as to function as an additional first support portion, and the bump foil is configured such that, when the load input from the rotating body increases, the first end of each coupling portion contacts the inner circumferential surface of the housing before the second end of the coupling portion contacts the outer circumferential surface of the top foil.

* * * * *